United States Patent Office 3,674,560
Patented July 4, 1972

3,674,560

PROCESS FOR PREPARING COPPER SULFIDE VOLTAIC CELL CATHODES

Hanspeter Alder, Newark, Del., assignor to E. I. du Pont de Nemours and Company, Wilmington, Del.

No Drawing. Filed Apr. 8, 1970, Ser. No. 26,761
Int. Cl. H01m 35/02
U.S. Cl. 136—23 10 Claims

ABSTRACT OF THE DISCLOSURE

Copper sulfide cathodes having improved discharge characteristics and increased electrochemical utilization of copper sulfide can be prepared by reducing, in a copper sulfide having a chemically bound sulfur to copper ratio of at least 0.94:1, to less than 2% the portion of the copper sulfide substance that is extractable by hot 0.5 N. aqueous hydrochloric acid. Highly efficient voltaic cells can be produced using this cathode structure.

BACKGROUND OF THE INVENTION

Copper sulfide, when calculated as cupric sulfide, can theoretically accept two electrons, per copper atom, from an electron-rich anode source. In actual use however one does not achieve such level of electron acceptance. One difficulty is in fabricating cathodes to make all the copper sulfide available electrochemically. Various expedients have been proposed in the art for achieving this end, such as for example, by forming conductive copper sulfide pastes with an electrolyte liquid or by pressing particulate copper sulfide into a coherent, self-supporting mass in intimate electrical contact with a current collecting component of the cathode.

Although copper sulfide cathode performance can be somewhat improved by these techniques, they have not been entirely successful and the problem of obtaining high copper utilization is still not fully solved.

Dechenaux et al., in "Entropie," vol. 10, pp. 15–22 (1966) disclose a lithium anode cell having a cupric sulfide cathode. They state: "It is indispensable to prepare cupric sulfide, CuS, as pure as possible, free of cuprous sulfide, $Cu_2S$, and perfectly anhydrous. The procedure used permits obtaining a very reproducible, perfectly well defined electrode." The reference completely fails to define or disclose what is meant by the highly relative term "as pure as possible," why or to what degree impurities are harmful in a copper sulfide cathode or how to eliminate such impurities. In fact, the apparent requirement that such cupric sulfide be free of cuprous sulfide, would tend to teach away from consideration of other, even more harmful impurities. Cuprous sulfide itself is a cathode active material having, on a weight basis, only moderately lowered electrochemical capacity than that of cupric sulfide.

SUMMARY OF THE INVENTION

An improved voltaic cell can be prepared by forming the cathode from a copper sulfide having less than 2 wt. percent of its substance extractable in aqueous 0.5 N hydrochloric acid at from 75° to 85° C. and having a bound sulfur to copper ratio of at least 0.94:1.

DESCRIPTION OF THE INVENTION

It is known that copper sulfide undergoes auto-oxidation upon exposure to air. The invention is based on the discovery that removal of copper sulfide auto-oxidation products significantly inhances the performance of the copper sulfide as a cathode active materials and, further, that there are simple means of removing such impurities from copper sulfide and maintaining the copper sulfide free of such impurities before it is used in the cathode of a voltaic cell. Such auto-oxidation impurities are for example copper sulfate and copper thiosulfate. Despite the fact that such materials contain reducible copper and should therefor act as cathode active materials, they not only do not contribute to cathode utilization but are, surprisingly, more harmful to such electrochemical utilization than their concentration in the copper sulfide would indicate.

The requirement that the copper sulfide in such cathodes contains less than 2% by weight of its substance extractable by 0.5 N, dilute aqueous hydrochloric acid, assures the absence of these particularly harmful auto-oxidation products of copper sulfide in harmful quantities.

Since such impurities even at only 2% by weight can, in certain voltaic cells, have deleterious effects on cell properties other than the high utilization of cathode material, e.g. on shelf-life, it is preferred that there be less than 0.1% by weight of such acid extractable present in the copper sulfide.

The copper sulfide in such cathodes should have a sulfur-copper atom ratio of chemically bound sulfur to copper, of at least 0.94:1, assuring a maximum practical capacity, for a given weight of the copper sulfide, to accept electrons from an external cell circuit and to be reduced thereby. The low content of acid extractables and the above sulfur-copper ratio are both necessary to maximum electrochemical output and minimum cathode weight to produce a high energy density cathode.

These chemical properties are very simply demonstrated. A 20 g. sample of particulate copper sulfide having a maximum particle size of 50$\mu$ is dispersed in a 6 cm. diameter, heat resistant laboratory filter, 50 ml. portions of 0.5 N aqueous hydrochloric acid at 80±5° C. are passed by gravity flow through the bed of copper sulfide until the filtrate gives a negative copper-ammine test upon being made basic by the addition of aqueous ammonia. The copper sulfide is then washed with water at 80±5° C. until the filtrate is neutral, last the copper sulfide is dried to constant weight at 80±5° C. and reweighed. A weight loss of less than 2% indicates a satisfactory level of acid extractable impurities. A dry sample of acid extracted copper sulfide freed of any uncombined elemented sulfur (the presence of which would lead to incorrect analyses) by extraction with carbon disulfide, is quantitatively analyzed for copper and sulfur and the sulfur-copper weight ratio calculated from the analytical data. For an atom ratio of at least 0.94:1 the sulfur-copper weight ratio is at least 0.475:1. The practical attainable sulfur-copper atom ratio in copper sulfide is that of cupric sulfide (1:1).

Copper sulfide having the above chemical properties can be prepared by a variety of procedures. Various sources of commercial cupric sulfide have been found to contain acid extractable impurities in amounts sufficient to adversely affect eventual copper sulfide utilization in a voltaic cell; such copper sulfide can be made suitable by the extraction method of this invention.

An extraction medium can be an aqueous acid solution such as an aqueous acid solution having a pH less than 5 which provides anions making cupric impurities water soluble and which does not dissolve or otherwise chemically alter the cupric sulfide. Representative suitable acid solutions comprise water solutions of sulfuric, hydrochloric and hydrobromic acids. Normally the impure cupric sulfide is finely divided to facilitate contact of the extraction medium with the acid soluble impurities. Although larger particle sizes may be effectively extracted, particle sizes of less than about 100$\mu$ and, preferably, less than 50$\mu$ are highly desirable for ease of extraction. Cupric sulfiide so sized is commercially available or easily prepared by simple milling of the impure cupric sulfide.

The extraction process can be adapted from many art known processes designed to effect the liquid extraction of soluble impurities from insoluble substrates. Examples are percolation of the acid through a packed bed or column of the cupric sulfide. Alternatively, one can slurry the copper sulfide and the acid, repeatedly adding fresh acid to the slurry and decanting spent acid from the slurry. However, the process is conducted, its completion may be readily determined by the copper-ammine test. While such extraction processes may be conducted at ambient temperature, e.g. 15° to 40° C., higher temperatures, e.g. from below the boiling point of the acid down to about 70° C., accelerate the process and are therefore preferred. Also preferred because of availability, effectiveness and ease of handling is 0.2 to 5 N solutions of sulfuric or hydrochloric acids used at the above higher temperatures.

Following the extraction process the copper sulfide is freed of acid by water washing until the wash water is neutral. Next the product is dried under substantially non-oxidizing and non-decomposing conditions. Vacuum drying at 70° to 90° C. is effective and drying in a nitrogen or argon atmosphere can be employed to further assure minimum auto-oxidation.

Following this process and those to be described below, it will appreciated that the copper sulfide freshly freed of the auto-oxidation impurities either be used in a cell before significant renewed auto-oxidation occurs or that the copper sulfide be kept out of contact with the atmosphere or other sources of molecular oxygen. It is extremely important that the purity of the copper sulfide be maintained prior to its fabrication into a cathode.

Since free sulfur can be a byproduct of such acid extraction and since free sulfur in a copper sulfide cathode may shorten the shelf-life of certain non-aqueous voltaic cells, a refinement on the foregoing procedure is to remove any such elemental sulfur during the process. This is readily accomplished by including in the extraction procedure after acid extraction and before final water washing, extraction with dilute aqueous ammonium sulfide, e.g. with 10 weight percent $(NH_4)_2S$, or by extracting the dried cupric sulfide with a volatile sulfur solvent such as carbon disulfide, carbon tetrachloride, toluene or the like, followed by redrying to remove the solvent.

Suitable copper sulfide can also be prepared by providing in an aqueous acid solution of pH less than 2, a soluble cupric ion source and a sulfide ion source such as, for example hydrogen sulfide or an alkali metal sulfide, the anion of the copper salt and the cation of the sulfide source being reacted being such as to form a soluble by-product of the metathesis forming the insoluble copper sulfide. Conveniently hydrogen sulfide is passed into an aqueous acidic solution of a cupric salt. The resulting precipitate is then subjected to water washing and sulfur extraction as described above. A particular advantage of such process is that the strongly acidic conditions usually make further acid extraction unnecessary.

An embodiment of the above procedure, affording a finely divided form of copper sulfide, easily fabricated into self-supporting cathode structures, comprises for the precipitation step, passing hydrogen sulfide into an aqueous sulfuric acid solution of cupric sulfate. The solution is from about 1 to about 2 normal in sulfuric acid and has dissolved therein from about 5 to about 15% by weight of cupric sulfate pentahydrate. The process is conducted under agitation at from about 90 to about 98° C. To preclude possible auto-oxidation of the finely divided product, the process or portions thereof can be conducted in an inert atmosphere of argon, nitrogen or like gas which does not react with the product. The resulting product should be stored in an argon or nitrogen atmosphere until used in a cell.

Another process for preparing copper sulfide suitable for the present invention comprises preparing a mixture of finely divided copper and crystalline sulfur powders in about a 1:1 atom ratio and storing the mixture, in ambient air, at from about 20° C. to below the melting point of sulfur and preferably from about 20 to about 60° C. for a period sufficient to effect reaction of the copper and the sulfur. Next the aged mixture is subjected to the acid extraction and, optionally, to the $(NH_4)_2S$ sulfur extraction procedures, and then to the washing and drying procedures as described above. By finely divided is meant sulfur and copper powders having particle size affording sufficient area so that sulfur-copper contact is assured and that the reaction occurs in a practical time under the temperature conditions. To this end, it is preferred that the sulfur and copper powders have particle sizes of 50$\mu$ or less and that the copper be relatively porous, high surface, electrolytic copper dust. With the preferred copper powder and the crystalline sulfur powder, the sulfur-copper reaction is substantially completed in as little as two to five days at about 60° C. and from 10 to 100 days at 25° C. The degree of completion of the process can be monitored by periodically removing a sample of the mixture, subjecting it to carbon disulfide extraction and determining the weight loss in the sample due to the extraction of unreacted sulfur.

It will be appreciated that it is preferred to conduct the aging for a period sufficient to react substantially all the copper and the sulfur. However, the aging process continually produces copper sulfide, which, after the indicated extraction purification and drying, is suitable for this invention. Therefore, one could prepare a cathode from a "partially" aged mixture in which cathode the copper sulfide component is as defined. The only penalty in so doing would be, for example, obtaining a cathode having a greater or lesser content of dead-weight, e.g. copper metal, which makes no contribution to cathode performance.

A self-supporting cathode body having sufficient structural integrity to withstand mechanical stresses tending to cause physical deterioration during preparation, handling and use in a voltaic cell can be prepared from the copper sulfide defined above.

Such cathode structures are prepared from the fresh or protectively stored copper sulfide of the invention, in powdered form, by applying sufficient mechanical pressure to a portion of the powder to form a structure having both preselected dimensions and the self-supporting property. Pressures required vary widely with the nature of the press, the dimensions of the desired structure, the source of the copper sulfide powder and the amount of powder being pressed. Such pressures are, therefore, best determined by actual trial with the selected equipment, cathode weight, dimensions and copper sulfide. For example, with a powder press designed to produce flat disks of 6.55 cm.$^2$ surface and with 2 g. of the acid-extracted, commercial cupric sulfide ground to have a maximum particle size of 50$\mu$, pressure of 2800 kg. per cm.$^2$ gauge applied at 25° C. for 5 seconds produces satisfactory structures. With the couper sulfide powder, precipitated as in the above sulfuric acid-hydrogen sulfide process, pressures as low as about 700 kg. per cm.$^2$ gauge produce satisfactory structure from 2 g. of the powder.

The self-supporting cathode structure can be pressure molded into contact with a conductive mesh by such pressing process. Meshes such as graphitized cloth, stainless steel, iron, gold, platinum, nickel and the like can be employed. Although not necessary for excellent cathode performance, such mesh incorporation can serve two useful purposes. The mesh aids in charge distribution and at least the metal meshes reinforce the structures containing them. Because of availability, cost and mechanical strength nickel mesh is preferred. Nickel meshes with maximum mesh opening dimensions of from about 0.1 mm. to about 5 mm. are very satisfactory for incorporation into the present copper sulfide cathode structures.

Other materials can be incorporated into the cathode structure, e.g. by mixing them into the powdered sulfide before pressing. Such materials can include, for example, a powdered conductive material to improve cathode conductivity. Lamp black is an example. Resin binders for improving cathode structural integrity may similarly be incorporated during the pressing. The use of any such electrochemically non-contributing inclusions, i.e. meshes, conductivity improvers and binders has to be carefully considered in terms of benefit (increased conductivity, strength or binding) versus the dead-weight penalty incurred. Normally such materials as lamp black or a resin binder amount to no more than about 5% of the composition.

It has been discovered that cathode structures having superior self-supporting properties can be prepared from the powdered copper sulfides of the invention. The process comprises preparing a mixture of 70 to 90% by weight of a powdered copper sulfide of the invention and 30 to 10% by weight of a freshly prepared, 1:1 atom ratio blend of powdered copper, e.g. 50$\mu$ or smaller electrolytic copper dust, and powdered sulfur. The mixture is next subjected to enough pressure to form a body of the desired final cathode dimensions and having sufficient mechanical strength to be handled. The body is then heated to between 125° and about 400° C. for a period long enough to complete the reaction of the free copper and free sulfur. Completion of reaction is adequately indicated by the homogeneous appearance of the finished cathode structure or by a carbon disulfide extraction test indicating the absence of free sulfur in the structure.

Illustratatively, 1.6 g. of the freshly extracted and dried commercial copper sulfide powder is mixed with a 0.4 g. portion of a 1:1 atom ratio blend of sulfur powder and copper dust and the 2 g. mixture subjected to about 700 kg. per cm.$^2$ pressure for a few seconds at 25° C. in the above described 6.55 cm.$^2$ disk-producing powder press. The raw disk is then heated at atmospheric pressure for 10 minutes at 225° C. to produce a self-supporting structure.

The advantage of this process is that it provides a copper sulfide binder for a copper sulfide cathode structure. All cathode materials are active. There is no inert, dead-weight binder present.

The above-described cathode structures are useful in high energy density voltaic cells, particularly non-aqueous electrolyte, having an anode of one of the light metals of Groups I–A and II–A of the Periodic Table. Preferred cells are those in which the anode is lithium and the electrolyte is an inert, conductive, non-aqueous solution. Electrical energy is produced in an external circuit of such cells when the anode and cathode are externally connected while in mutual contact with the electrolyte.

EXAMPLES

Example 1

Hot (about 80° C.) 50 ml. portions of 0.5 N aqueous hydrochloric acid were passed through a 20 g. bed of commercial cupric sulfide on a 6 cm. diameter filter until three separately and sequentially collected 50 ml. portions of the filtrate failed to develop a blue color upon the addition thereto of excess aqueous ammonia. Next, the bed was washed on the filter with distilled water at about 80° C. until the filtrate was neutral to universal indicator paper. Finally the bed was dried in a vacuum oven at 70° C. and at 40 to 50 mm. Hg absolute pressure.

The extraction removed 9.6% by weight of impurities in the original cupric sulfide. The resultant powder was analyzed and found to contain 67.7% by weight copper and 32.75% by weight sulfur. The S:Cu atom ratio, calculated from these analytical data, was 0.96:1.

Example 2

A second commercial cupric sulfide powder from a different source was purified as in Example 1. The powder lost 22% by weight of its substance.

Example 3

An intimate mixture of a 1:1 atom ratio of crystalline sulfur powder and electrolytic copper dust having maximum particle sizes of 50$\mu$ was aged at about 25° C. for 103 days in air. The resulting dark blue powder was subjected to carbon disulfide extraction which removed 0.7% by weight of sulfur, freed of $CS_2$ and then subjected to the hot, 0.5 N hydrochloric acid extraction, as in Example 1, which removed 7.7% by weight of acid soluble impurities, and left a powder, after drying, having, by analysis, 66.2% by weight copper and 35.0% by weight sulfur. The copper sulfide in the finished product had, therefore, a 1:1 sulfur-copper atom ratio.

Example 4

Cupric sulfide was prepared by passing hydrogen sulfide into an argon-purged, hot (96–98° C.) solution of 50 g. of $CuSO_4.5H_2O$ in 500 ml. of distilled water containing 45 g. of 98% sulfuric acid. When precipitation stopped, the precipitated cupric sulfide was recovered by filtration under an argon atmosphere, washed with 150 ml. of distilled water and then with five 100 ml. portions of 10% by weight aqueous ammonium sulfide. Finally the precipitate was washed with four 100 ml. portions of distilled water and dried at 80° C. in a vacuum oven at 40 to 50 mm. Hg absolute pressure.

The highly acidic condition of the precipitate during its formation and during the preliminary washing assured the absence of acid soluble impurities and the ammonium sulfide wash removed any free sulfur. Analysis indicated a sulfur-copper ration of 0.97:1.

In the following examples, illustrating processes for preparing self-supporting copper sulfide cathode structures, copper sulfide prepared as in the above examples was used within 24 hours to preclude significant autooxidation.

Example 5

Onto the base plate of a powder press, designed to produce flat disks having a single face area of 6.55 cm.$^2$, were evenly distributed 2 g. of the purified copper sulfide powder of Example 1, the powder having been reground in a mortar until it had a particle size less than 50$\mu$. A flat disk of expanded nickel metal mesh, having openings of approximately 2 x 5 mm. and cut to fit the die bore, was placed on the powder layer. With the press at 25° C. a pressure of 2800 kg. per cm.$^2$ was applied to the copper sulfide-nickel mesh. There resulted a flat, self-supporting disk weighing 1.978 g. exclusive of the nickel mesh. Disk dimensions were determined by measurement and from them and the above weight the disk porosity was calculated from the apparent density, 3.44 g. per cm.$^3$. The porosity was 100$\times$ $$\left(1-\frac{3.44}{4.6}\right)$$

i.e. 25% exclusive of the nickel mesh.

Example 6

A 2 g. portion of the unextracted copper sulfide powder of Example 1 was pressed into a self-supporting disk as in Example 5.

Example 7

A 2 g. portion of the extracted copper sulfide powder of Example 2 was pressed into a self-supporting disk as in Example 5.

Example 8

A 2 g. portion of the unextracted copper sulfide powder of Example 2 was pressed into a self-supporting disk as in Example 5.

Example 9

A 2 g. portion of the copper sulfide powder of Example 3 was pressed into a self-supporting disk as in Example 5.

Example 10

A cathode disk was prepared as in Example 5 from the sulfur-copper powder mixture prepared and aged as in Example 3 but not subjected to acid extraction.

Example 11

A self-supporting disk was prepared from 2 g. of the precipitated copper sulfide powder of Example 4. The pressing procedures of Example 5 was utilized except that the pressure required to form the disk was only 690 kg. per cm.$^2$ gauge.

That such a low pressure would form a self-supporting cathode disk is surprising, as is indicated by the following comparative example.

Example 12

An attempt was made to prepare a cathode disk as in Comparative Example A utilizing 1700 kg. per cm.$^2$ gauge. The disk disintegrated upon removal from the press.

The following example illustrates practically universal method for moderate pressure preparation of self-supporting copper sulfide cathode structures.

Example 13

To freshly purified copper sulfide powder, prepared as in Example 1 was added 20% by weight of a freshly prepared copper-sulfur powder mixture prepared as in Example 3. The combined copper sulfide, copper and sulfur were intimately mixed and a 2 g. portion of the resulting mixture was pressed at 25° C. into a disk at 690 kg. per cm.$^2$ gauge using the powder press described in Example 5. Next the resulting raw disk was heated for 10 minutes at 225° C. in air and allowed to cool to room temperature. A coherent, self-supporting disk resulted.

In the absence of the copper and sulfur powders and the heating step, a pressure of about 2800 kg. per cm.$^2$ would be required to provide a self-supporting structure.

Example 14

Following the prior art procedure of French Pat. No. 1,490,725 an intimate mixture of sublimed sulfur and electrolytic copper powders having maximum particle sizes of 50$\mu$ was prepared. A 2 g. of portion of the fresh mixture was pressed, in the powder press of Example 4, at 140° C. for 15 hours at an initial pressure 490 kg. per cm.$^2$ gauge. The resulting inhomogeneous disk was next heated for 15 hours at 140° C. Analysis for copper and sulfur content of this disk indicated a bound sulfur to copper atom ratio of 0.85:1.

The following examples demonstrate the lithium anode, voltaic cell performances of the self-supporting cathode structures of the foregoing examples. In all the examples, an excess of from 1.5 to 1.8 equivalents of lithium per equivalent of copper sulfide was used.

Example 15

The copper sulfide cathode structure of Example 5 was tightly fitted, mesh side to nickel, into a cylindrical, machined recess in a nickel plate. In a dry argon atmosphere the recess in a matching plate was filled with 0.5 g. of lithium metal. A cell was prepared in the argon atmosphereby bolting the two plates together with nylon bolts against a 0.5 mm. thick, circular pad of non-woven ceramic fiber held inside a polypropylene spacer ring of somewhat larger diameter than the cathode and anode recesses. A tight seal between the edges of the spacer and the nickel plates was assured by using synthetic chlorinated rubber gaskets. There resulted a cell with anode and cathode faces spaced 0.4 mm. apart. The cell was evacuated to 0.1 mm. Hg absolute pressure and allowed to fill, until the pressure was at atmospheric pressure, with an electrolyte solution consisting essentially of 20 weight percent of lithium hexafluoropohosphate and 80 weight percent methyl acetate. Next, the cell was discharged at a constant current of 11.1 milliamperes until cell voltage fell to 1.0 volt. Discharge time was 83.9 hours. That is, the cell produced $.0111 \times 83.9$ or 0.923 ampere hours. Since there was 1.978 g. of copper sulfide in the cathode disk, i.e. 0.0414 equivalents, calculated as CuS, and since there are 26.8 ampere-hours per equivalent, there was originally 1.11 ampere-hours in the cathode. Therefore, the cathode utilization value was $0.923/1.11 \times 100$ or 83.2%, i.e. was 83.2% of the copper sulfide in the cathode was utilized during the discharge.

Examples 16–21 were conducted by the procedures of Example 15. The following table summarizes cathode characteristics of Examples 15–23. Examples 15, 17, 19 and 20 use cathodes of this invention, while Examples 16, 18 and 21 are comparative examples.

TABLE

| Example number | Cathode from Example number— | Atom ratio, S:Cu | Content extractable by HCl, wt. percent | Cathode utilization, calc'd as CuS, percent | Porosity, exclusive of Ni mesh |
|---|---|---|---|---|---|
| 15 | 5 | 0.96:1 | Nil | 83 | 25 |
| 16 | 6 | 0.96:1 | 9.6 | 59 | 22 |
| 17 | 9 | 1:1 | Nil | 95 | 30 |
| 18 | 10 | [1] 1:1 | 7.7 | 66 | 34 |
| 19 | 11 | 0.97:1 | [1] <0.1 | 77 | 55 |
| 20 | 13 | [1] 0.94:1 | [1] <0.1 | 87 | 23 |
| 21 | 14 | 0.85:1 | ---------- | 49 | 22 |

[1] Calculated.

The data in the foregoing table clearly indicate the simultaneous importance of hot acid extraction and S:Cu ratio to cathode effectiveness. To obtain a superior cathode, e.g. one in which 60 to greater than 90% cathode utilization is assured, the cathodes must contain a minimum of acid extractables and preferably must have a sulfur to copper atom ratio of at least about 0.94:1, i.e., in the chemically bound sulfur and copper.

The data also indicate that such acid extraction performs a more important function than the simple removal of dead-weight, non-contributing impurities. Thus, comparing the Example 15 cathode with that of Example 16, pressed from the same copper sulfide powder unextracted, it is apparent that the 9.6% of material removed by extraction was not simply deadweight but actually a harmful impurity. That is, one might have expected that at least 94.5% of the cathode substance was still fully active; however, that situation would have afforded at 75% utilization, not the 59% actually observed. Example 17 and comparative Example 18 similarly show the excessively detrimental effect of the impurities removed by the extraction procedure.

The data also indicate that the processes of the invention provide cathode structures having a relatively wide range of porosities. Low porosity cathodes such as those of Examples 15, 17 and 20 have a greater coulombic output per unit volume than the intermediate or high porosity cathode of Example 19. The cathodes with greater porosity can provide a higher cell drain rate because of increased ease of mass transport within the more porous structure.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. In a process for preparing a voltaic cell cathode consisting essentially of copper sulfide and means for electrically connecting the copper sulfide in the voltaic cell, the improvement comprising preparing the copper sulfide used by (a) contacting particulate copper sulfide with an aqueous acid solvent having a pH of less than 5 in which copper sulfide is essentially insoluble, whereby soluble impurities are dissolved from said copper sulfide;
(b) separating said acid solvent and dissolved impurities from said copper sulfide and dissolving free sulfur from the wet copper sulfide with about 10% aqueous ammonium sulfide before the final washing; and
(c) drying the washed copper sulfide under substantially non-oxidizing conditions.

2. In a process for preparing a voltaic cell cathode consisting essentially of copper sulfide and means for electrically connecting the copper sulfide in the voltaic cell, the improvement comprising preparing the copper sulfide used by (a) contacting particulate copper sulfide with an aqueous acid solvent having a pH of less than 5 in which copper sulfide is essentially insoluble, whereby soluble impurities are dissolved from said copper sulfide;
(b) removing said acid solvent and dissolved impurities from said copper sulfide by at least one washing step;
(c) drying the washed copper sulfide under substantially non-oxidizing conditions;
(d) extracting the dry copper sulfide with a volatile sulfur solvent; and
(e) evaporating the sulfur solvent from the copper sulfide.

3. In a process for preparing a voltaic cell cathode consisting essentially of copper sulfide and means for electrically connecting the copper sulfide in the voltaic cell, the improvement comprising preparing the copper sulfide used by (a) contacting an acidic solution at a temperature of from about 70° C. to below the boiling point of the solution, of a cupric ion source with a source of sulfide ion at concentrations sufficient to precipitate copper sulfide;
(b) separating said acid solvent from said copper sulfide and dissolving free sulfur from the wet copper sulfide with about 10% aqueous ammonium sulfide before the final washing; and
(c) drying the washed copper sulfide under substantially non-oxidizing conditions.

4. In a process for preparing a voltaic cell cathode consisting essentially of copper sulfide and means for electrically connecting the copper sulfide in the voltaic cell, the improvement comprising preparing the copper sufide used by (a) contacting an acidic solution at a temperature of from about 70° C. to below the boiling point of the solution, of a cupric ion source with a source of sulfide ion at concentrations sufficient to precipitate copper sulfide;
(b) removing said acidic solution from said copper sulfide precipitate by at least one washing step;
(c) drying the washed copper sulfide under substantially non-oxidizing conditions;
(d) extracting the dry copper sulfide with a volatile sulfur solvent; and
(e) evaporating the sulfur solvent from the copper sulfide.

5. In a process for preparing a voltaic cell cathode consisting essentially of copper sulfide and means for electrically connecting the copper sulfide in the voltaic cell, the improvement comprising preparing the copper sulfide used by (a) aging at from about 20 to about 60° C. an intimate mixture of finely divided crystalline sulfur powder and finely divided copper metal powder whereby the copper and sulfur react forming copper sulfide;
(b) contacting the copper sulfide with an aqueous acid solvent having a pH of less than 5 in which copper sulfide is essentially insoluble whereby soluble impurities are dissolved from said copper sulfide;
(c) removing said acid solvent and dissolved impurities from said copper sulfide by washing, and dissolving free sulfur from the wet copper sulfide with about 10% aqueous ammonium sulfide before the final washing; and
(d) drying the washed copper sulfide under substantially non-oxidizing conditions.

6. In a process for preparing a voltaic cell cathode consisting essentially of copper sulfide and means for electrically connecting the copper sulfide in the voltaic cell, the improvement comprising preparing the copper sulfide used by (a) aging at from about 20 to about 60° C. an intimate mixture of finely divided crystalline sulfur powder and finely divided copper metal powder whereby the copper and sulfur react forming copper sulfide;
(b) contacting the copper sulfide with an aqueous acid solvent having a pH of less than 5 in which copper sulfide is essentially insoluble whereby soluble impurities are dissolved from said copper sulfide;
(c) removing said acid solvent and dissolved impurities from said copper sulfide by washing;
(d) drying the washed copper sulfide under substantially non-oxidizing conditions;
(e) extracting the dry copper sulfide with a volatile sulfur solvent; and
(f) evaporating the sulfur solvent from the copper sulfide.

7. A process for forming a voltaic cell cathode structure consisting essentially of copper sulfide comprising the steps of:

(a) contacting particulate copper sulfide with an aqueous acid solvent having a pH of less than 5 in which copper sulfide is essentially insoluble to extract soluble impurities from said copper sulfide;
(b) removing said acid solvent from said copper sulfide by at least one washing step; and
(c) drying the washed copper sulfide under substantially non-oxidizing conditions;
(d) forming an intimate mixture of from about 90 to about 70 wt. percent of the copper sulfide of step (c) complementally with from about 10 to about 30 wt. percent of about a 1:1 atom ratio mixture of finely divided copper and finely divided sulfur;
(e) subjecting said intimate mixture of step (d) to mechanical pressure to form a coherent body; and
(f) heating the body of step (e) at from about 125° to about 400° C. to effect a substantially complete reaction of the free copper and free sulfur.

8. A process for forming a voltaic cell cathode structure consisting essentially of copper sulfide comprising the steps of:

(a) contacting an acidic solution at a temperature of from about 70° C. to below the boiling point of the solution, of a cupric ion source with a source of sulfide ion at concentrations sufficient to produce a copper sulfide precipitate;
(b) removing said acidic solution from said copper sulfide precipitate by at least one washing step;
(c) drying the washed copper sulfide under substantially non-oxidizing conditions;
(d) forming an intimate mixture of from about 90 to about 70 wt. percent of the copper sulfide of step (c) complementally with from about 10 to about 30 wt. percent of about a 1:1 atom ratio mixture of finely divided copper and finely divided sulfur;
(e) subjecting said intimate mixture of step (d) to mechanical pressure to form a coherent body; and
(f) heating the body of step (e) at from about 125° to about 400° C. to effect a substantially complete reaction of the free copper and free sulfur.

9. A process for forming a voltaic cell cathode structure consisting essentially of copper sulfide comprising the steps of:

(a) aging in air at from about 20° C. to below the melting point of sulfur an intimate mixture of finely divided crystalline sulfur powder and finely divided copper metal powder to effect reaction of the copper and sulfur to produce copper sulfide;

(b) mixing the copper sulfide with an aqueous acid solvent having a pH of less than 5 in which copper sulfide is essentially insoluble to extract soluble impurities from said copper sulfide;

(c) removing said acid solvent from said copper sulfide by washing;

(d) drying the washed copper sulfide under substantially non-oxidizing conditions;

(e) forming an intimate mixture of from about 90 to about 70 wt. percent of the copper sulfide of step (d) complementally with from about 10 to about 30 wt. percent of about a 1:1 atom ratio mixture of finely divided copper and finely divided sulfur;

(f) subjecting said intimate mixture of step (e) to mechanical pressure to form a co-herent body; and (g) heating the body of step (e) at from about 125° to about 400° C. to effect a substantially complete reaction of the free copper and free sulfur.

10. A process of claim 9 for forming a voltaic cell cathode structure in which the finely divided copper is electrolytic copper dust.

References Cited

UNITED STATES PATENTS

| | | | |
|---|---|---|---|
| 2,332,145 | 10/1943 | Hay | 23—135 |
| 2,357,990 | 9/1944 | Amenabar | 23—135 |
| 2,755,172 | 7/1956 | McGauley et al. | 23—135 X |
| 3,248,265 | 4/1966 | Herbert | 136—6 |
| 3,423,242 | 1/1969 | Meyers et al. | 136—6 |

ANTHONY SKAPARS, Primary Examiner

U.S. Cl. X.R.

23—135